US012564921B2

(12) United States Patent
Owen et al.

(10) Patent No.: US 12,564,921 B2
(45) Date of Patent: Mar. 3, 2026

(54) FLIP SOCKET ADAPTERS

(71) Applicant: Klein Tools, Inc., Lincolnshire, IL (US)

(72) Inventors: Kurt Owen, Aurora, IL (US); Jonathan Gimondo, Arlington Heights, IL (US)

(73) Assignee: Klein Tools, Inc., Lincolnshire, IL (US)

( * ) Notice: Subject to any disclaimer, the term of this patent is extended or adjusted under 35 U.S.C. 154(b) by 267 days.

(21) Appl. No.: 17/898,213

(22) Filed: Aug. 29, 2022

(65) Prior Publication Data

US 2023/0062875 A1 Mar. 2, 2023

Related U.S. Application Data

(60) Provisional application No. 63/238,893, filed on Aug. 31, 2021.

(51) Int. Cl.
*B25B 23/00* (2006.01)
*B25B 13/06* (2006.01)

(52) U.S. Cl.
CPC ........ *B25B 23/0035* (2013.01); *B25B 13/065* (2013.01)

(58) Field of Classification Search
CPC ..... B25B 13/06; B25B 13/065; B25B 13/102; B25B 13/107; B25B 15/004; B25B 15/008; B25B 15/005; B25B 15/007; B25B 23/0007; B25B 23/0021; B25B 23/0035; B25G 1/043; B25G 1/085; B25F 1/02
See application file for complete search history.

(56) References Cited

U.S. PATENT DOCUMENTS

| | | | | | |
|---|---|---|---|---|---|
| 2,718,806 | A * | 9/1955 | Clark | H01F 7/0257 | 81/177.85 |
| 4,798,111 | A * | 1/1989 | Cheeseman | B25B 13/06 | 81/177.4 |
| 5,943,924 | A * | 8/1999 | Jarvis | B25G 1/043 | 81/185 |
| 9,981,366 | B2 * | 5/2018 | Todd | B25B 23/12 | |
| 11,806,845 | B1 * | 11/2023 | Grbach | B25G 1/007 | |
| 2008/0041193 | A1 * | 2/2008 | Baker | B25B 13/06 | 81/124.6 |
| 2013/0239755 | A1 * | 9/2013 | Khangar | B25B 23/12 | 81/125 |
| 2014/0311302 | A1 * | 10/2014 | Taguchi | B25B 23/0035 | 81/125 |

* cited by examiner

*Primary Examiner* — Robert J Scruggs

(57) ABSTRACT

A tool includes a reversable first socket having a pair of opposed first socket ends and a first engagement portion therebetween, and a reversable second socket having a pair of second opposed socket ends and a second engagement portion therebetween. The tool includes an elongated first adapter having a driven end, a first drive end opposite the driven end, and an extending length therebetween. The tool includes an elongated second adapter having a receiving end opposite a second drive end. The receiving end includes a first interior portion, a second interior portion connected to the first interior portion, and a third interior portion connected to the second interior portion. In a first configuration, the first drive end is engaged to the first engagement portion. In a second configuration, the second drive end is engaged to the second engagement portion. In a third configuration, the second drive end is engaged to the second engagement portion, and the first drive end is engaged with the third interior portion.

20 Claims, 7 Drawing Sheets

FLIP SOCKET ADAPTERS

CROSS-REFERENCE TO RELATED APPLICATIONS

This patent application claims the benefit of U.S. Provisional Patent Application No. 63/238,893, filed on Aug. 31, 2021, the entire contents of which is herein incorporated by reference.

BACKGROUND OF THE DISCLOSURE

The present disclosure relates to reversible sockets. Reversable sockets are traditionally used with drive members such as socket wrenches. Other wrenches that use reversible sockets include, for example, impact drivers, ratcheting socket wrenches, pneumatic impact wrenches, hydraulic torque wrenches, torque multipliers, and breaker bars, etc. Reversible sockets typically have two opposing ends for use with threaded fasteners. The ends typically are of different sizes to allow a user to use a single reversable socket with threaded fasteners having heads of different sizes.

BRIEF SUMMARY OF THE DISCLOSURE

In accordance with one feature of this disclosure, a tool is provided and includes a reversable first socket having a first socket end configured to engage a bolt having a first size, a second socket end configured to engage a bolt having a second size, and a first engagement portion therebetween. The tool includes a reversable second socket having a third socket end configured to engage a bolt having a third size, a fourth socket end configured to engage a bolt having a fourth size and a second engagement portion therebetween. The tool includes an elongated first adapter having a driven end, a first drive end opposite the driven end, and an extending length therebetween. The reversable first socket is configured to allow the first drive end to pass through the first socket end to engage the first engagement portion and to allow the first drive end to pass through the second socket end to engage the first engagement portion. The tool includes an elongated second adapter having a receiving end opposite a second drive end. The receiving end includes a first driven socket configured to receive a drive member, a second driven socket configured to receive the first drive end, and a passage extending from the first driven socket to the second driven socket. The reversable second socket is configured to allow the second drive end to pass through the third socket end to engage the second engagement portion and to allow the second drive end to pass through the fourth socket end to engage the second engagement portion.

In one feature, the second drive end includes a ball detent configured to engage a detent groove associated with the second engagement portion.

According to another feature, the first drive end of the elongated first adapter includes a ball detent configured to engage a first detent groove associated with the second driven socket.

As one feature, the first size and the second size are greater than the third size and the fourth size.

In one feature, the first socket end, second socket end, third socket end, and fourth socket end are substantially hexagonal and are each configured to engage bolts having hexagonal heads of different sizes.

According to another feature, when arranged in a first configuration where the driven end is received by an impact driver, the rectangular first drive end is received by the first engagement portion and torque applied from the impact driver to the driven end is transferred to the first socket end or the second socket end.

As one feature, when arranged in a second configuration where the driven end is received by an impact driver, the rectangular first drive end is received by the rectangular interior length, and the rectangular second drive end is received by the second engagement portion, torque applied from the impact driver to the driven end is transferred to the third socket end or the fourth socket end.

In accordance with one feature of this disclosure, a tool includes a first socket having a pair of opposed first socket ends and a first engagement portion therebetween. The tool includes a second socket having a pair of second opposed socket ends and a second engagement portion therebetween. The tool includes a first adapter having a driven end, a first drive end opposite the driven end, and an extending length therebetween. The reversable first socket is configured to allow the first adapter to pass through one of the first socket ends to engage the first engagement portion. The tool includes an elongated second adapter having a receiving end opposite a second drive end. The receiving end includes a first interior portion configured to receive a drive shaft, a second interior portion connected to the first interior portion and configured to allow the first drive end to pass therethrough, and a third interior portion connected to the second interior portion and configured to engage the first drive end. The reversable second socket is configured to allow the second drive end to pass through one of the second socket ends to engage a the second engagement portion.

In one feature, the second drive end of the second adapter includes a ball detent configured to engage a detent groove associated with the second engagement portion.

According to another feature, the first drive end of the first adapter comprises a ball detent configured to engage a first detent groove associated with the third interior portion or a second detent groove associated with the first engagement portion of the reversable first socket.

As one feature, the first socket ends and the second socket ends are substantially rectangular and configured to engage a bolt having a rectangular head.

In one feature, when arranged in a first configuration where the driven end is received by an impact driver and the first drive end is received by the first engagement portion, torque applied from the impact driver to the driven end is transferred to the pair of opposed first socket ends.

According to another feature, when arranged in a second configuration where the driven end is received by an impact driver, the first drive end is received by the third interior portion, and the second drive end is received by the second engagement portion, torque applied from the impact driver to the driven end is transferred to the pair of opposed first socket ends.

In accordance with one feature of this disclosure, a tool includes a reversable first socket having a pair of opposed first socket ends and a first engagement portion therebetween, and a reversable second socket having a pair of second opposed socket ends and a second engagement portion therebetween. The tool includes an elongated first adapter having a driven end, a first drive end opposite the driven end, and an extending length therebetween. The tool includes an elongated second adapter having a receiving end opposite a second drive end. The receiving end includes a first interior portion, a second interior portion connected to the first interior portion, and a third interior portion connected to the second interior portion. In a first configuration, the first drive end is engaged to the first engagement portion with the driven end extending from the reversable first socket to transfer torque to the reversible first socket from a driver engaged with the driven end. In a second configuration, the second drive end is engaged to the second engagement portion with the receiving end extending from the reversable second socket to transfer torque to the reversible second socket from a driver engaged with the first interior portion. In a third configuration, the second drive end is engaged to the second engagement portion with the receiving end extending from the reversable second socket, and the first drive end is engaged with the third interior portion with the driven end extending from the elongated second adapter to transfer torque from a driver engaged with the driven end to the second adapter and the reversible second socket.

As one feature, the first drive end includes a first ball detent configured to engage a first detent groove associated with the third interior portion or a second detent groove associated with the first engagement portion, and the second drive end comprises a second ball detent configured to engage a third detent groove associated with the second engagement portion.

In one feature, the first socket ends and the second socket ends are substantially hexagonal and configured to engage bolts having substantially hexagonal heads.

According to another feature the first socket ends and the first engagement portion comprise a common cavity within the reversible first socket.

As one feature, the first interior portion, the second interior portion, and the third interior portion comprise a common cavity within the elongated second adapter, the extending length of the elongated first adapter and the second interior portion of the elongated second adapter are circular, and the second interior portion of the elongated second adapter is sized to receive the extending length of the elongated first adapter.

In another feature, one of the pair of opposed first socket ends is configured to drivingly engage a threaded fastener having a first size and the other socket of the pair of opposed first socket ends is configured to drivingly engage a threaded fastener having a second size different from the first size.

According to another feature, one of the pair of opposed second socket ends is configured to drivingly engage a threaded fastener having a third size and the other socket of the pair of opposed second socket ends is configured to drivingly engage a threaded fastener having a fourth size different from the third size. The third and fourth sizes are each different than the first and second sizes.

It should be understood that the inventive concepts disclosed herein do not require each of the features discussed above, may include any combination of the features discussed, and may include features not specifically discussed above.

BRIEF SUMMARY OF THE SEVERAL VIEWS OF THE DRAWINGS

FIG. 5A is an assembled perspective view from the front and side of the reversable flip socket in another configuration.

FIG. 5C is a section view taken along line 5-5 in FIG. 5B.

DETAILED DESCRIPTION OF PREFERRED EMBODIMENTS

Figure 1:
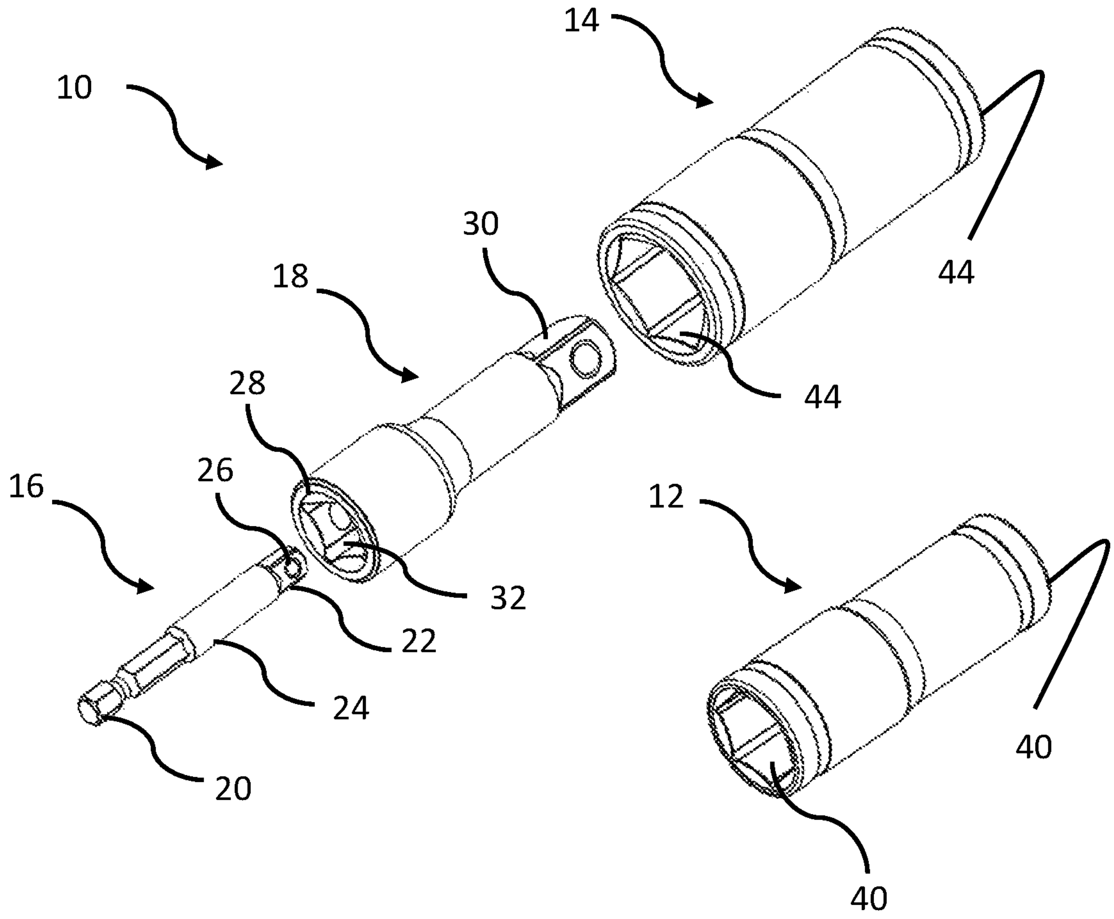
FIG. 1 is a perspective view from the front and side of a reversable flip socket set.

As best seen in FIG. 1, a reversable flip socket set 10 is provided. In the illustrated and preferred embodiment, the socket set 10 includes a reversable first socket 12, a reversable second socket 14, a first adapter 16, and a second adapter 18. The first adapter 16 and/or the second adapter 18 are attachable to drive members such as impact drivers and/or socket wrenches. The first adapter 16 and second adapter 18 are attachable individually and/or in combination with each other to the first socket 12 and/or the second socket 14 to allow a user to easily switch between sockets of varying sizes, for example, to drive bolts having heads of varying sizes.

In the illustrated and preferred embodiment, the first adapter 16 is shown in the form of an elongated first adapter 16 having a driven end 20 a first drive end 22, and an extending length 24 therebetween. In the illustrated and preferred embodiment, the driven end 20 comprises a hexagonal shank and is configured to be received by an impact driver. The first drive end 22 is shown in a rectangular (e.g., square) form and comprises a ball detent 26. In the illustrated and preferred embodiment, the extending length 24 is in a circular form and connects the driven end 20 to the first drive end 22.

Figure 2A:
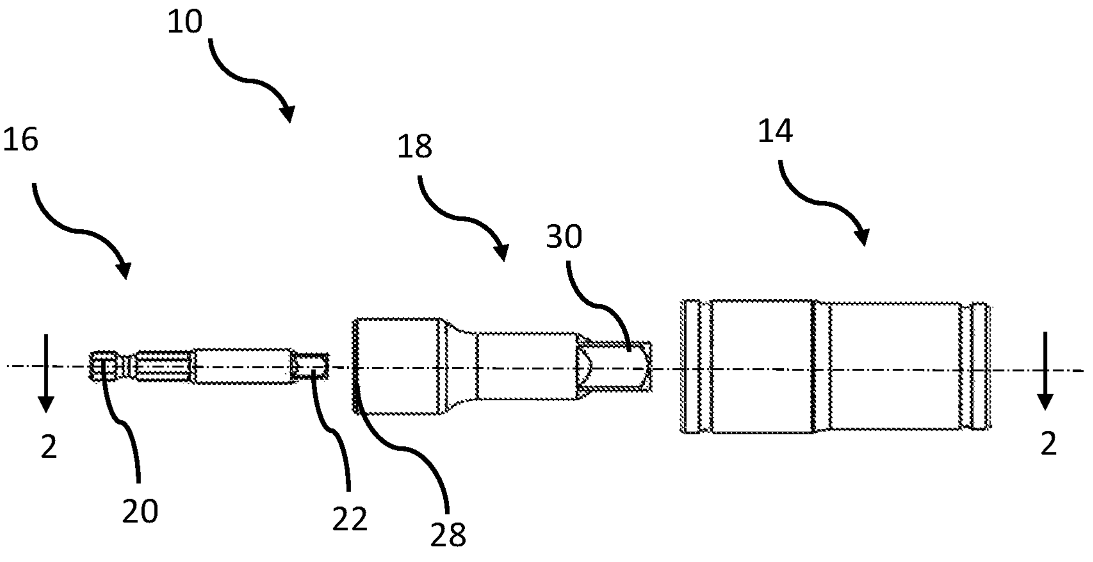
FIG. 2A is an exploded view of a first adapter, a second adapter, and a reversable socket of the reversable flip socket set shown in FIG. 1.
Figure 2B:
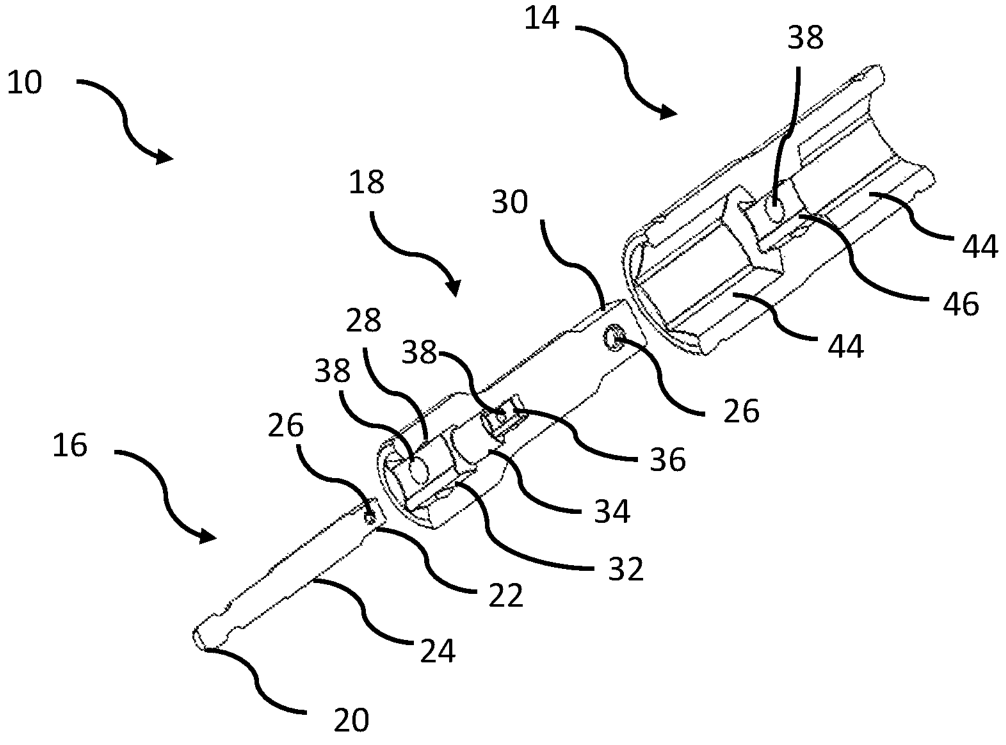
FIG. 2B is a perspective section view, from the front and side, taken along line 2-2 in FIG. 2A.
Figure 3A:
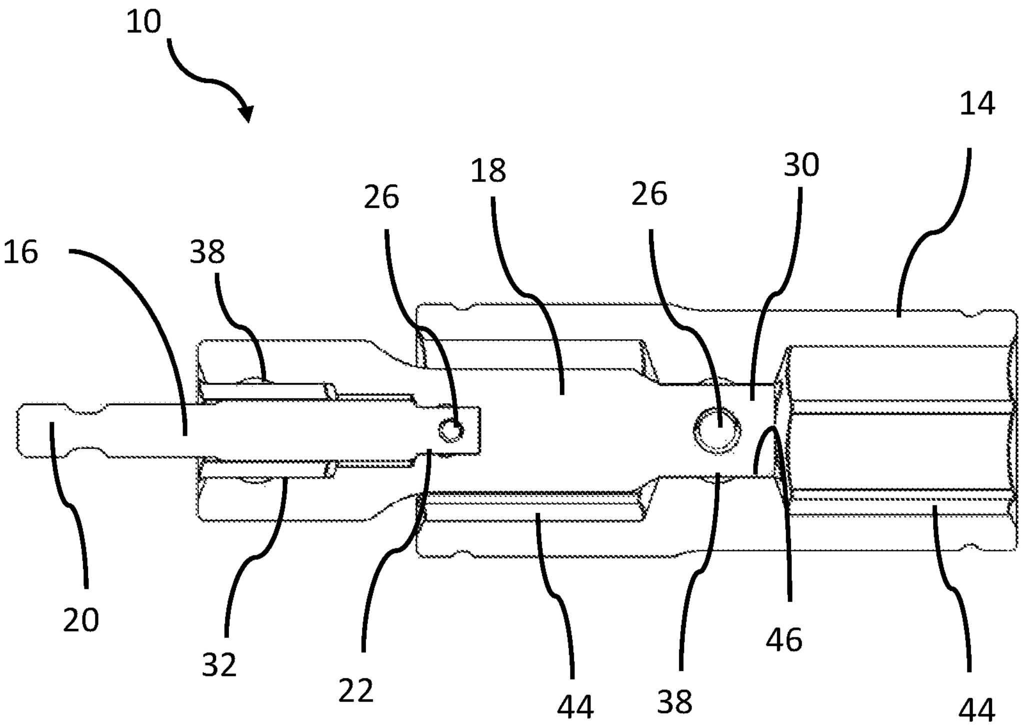
FIG. 3A is a section view the first adapter, the second adapter, the reversable socket shown in FIG. 2B in an assembled configuration.
Figure 3B:
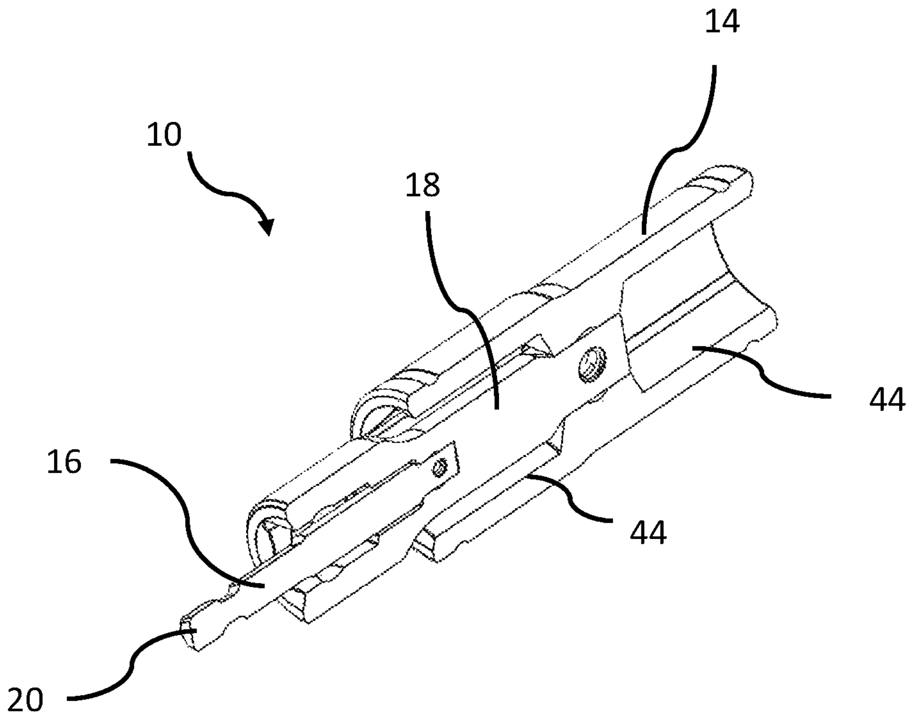
FIG. 3B is a perspective section view of the assembled configuration of FIG. 3A.
Figure 5B:
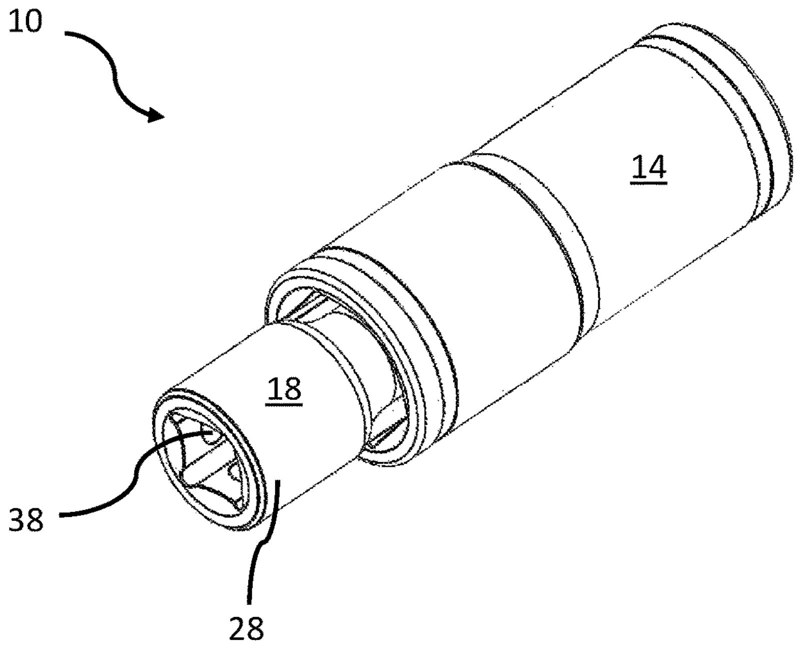
FIG. 5B is an assembled side view of the reversible flip socket of FIG. 5A.
Figure 5B:
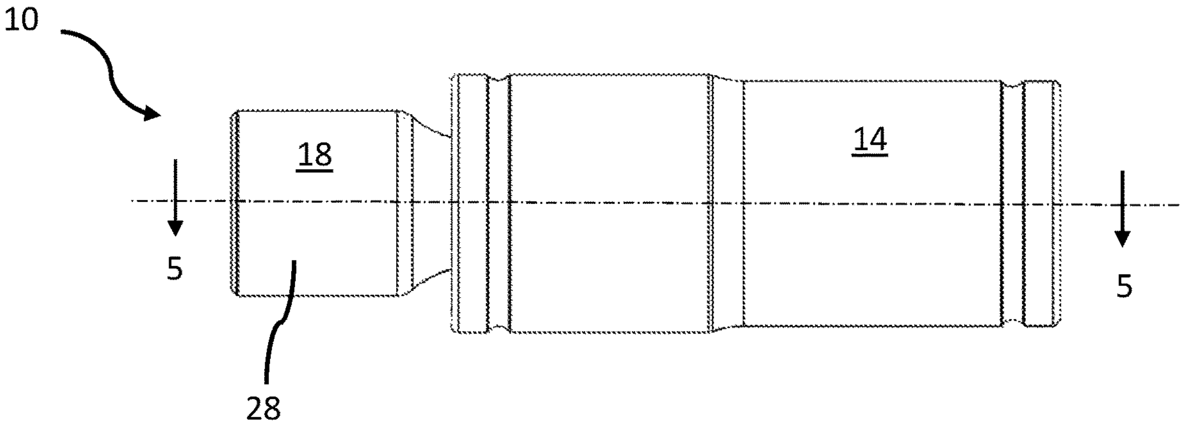
Figure 5D:
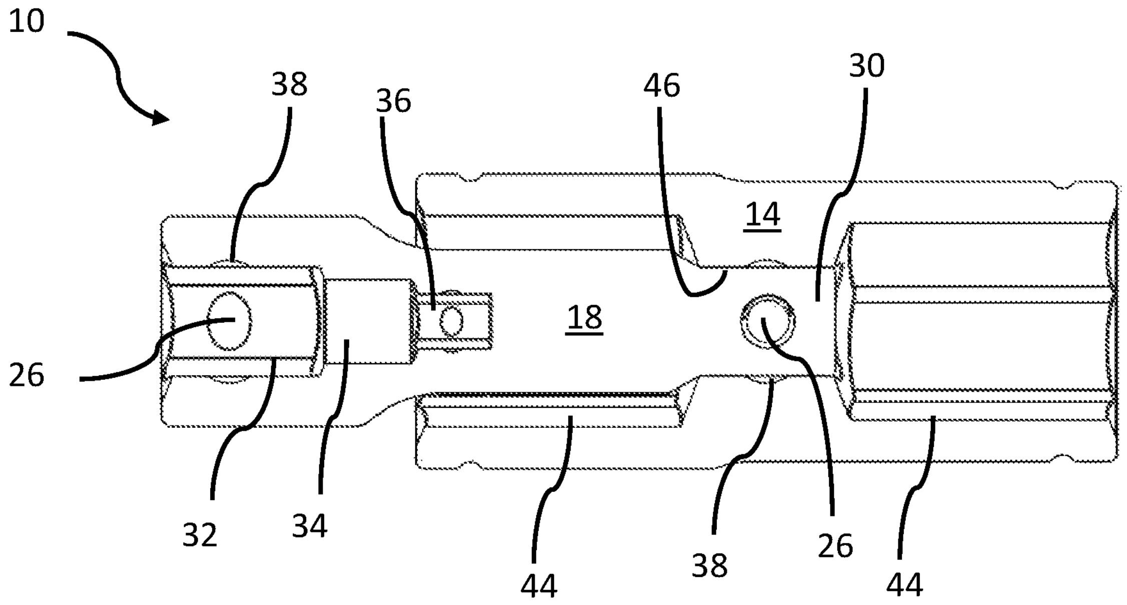
FIG. 5D is a perspective section view taken along line 5-5 in FIG. 5B.
Figure 5D:
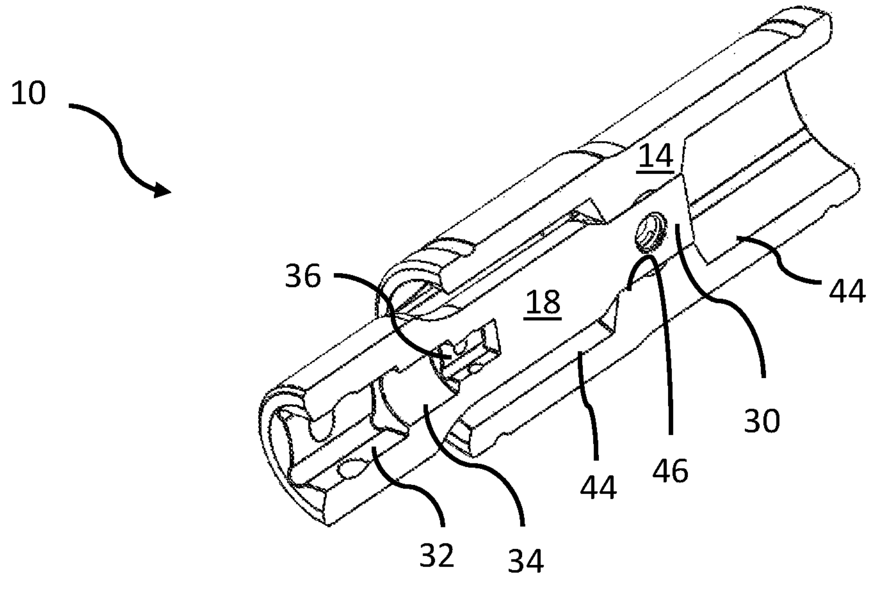

In the illustrated and preferred embodiment, the second adapter 18 is shown in the form of an elongated second adapter 18 having a receiving end 28 opposite a second drive end 30. In the illustrated and preferred embodiment, as best shown in FIGS. 2B and 5D, the receiving end 28 comprises a first interior portion 32 (e.g., first driven socket), a second interior portion 34 (e.g., passage) connected to the first interior portion 32, and a third interior portion 36 (e.g., second driven socket) connected to the second interior portion 32. In the illustrated and preferred embodiment, the first interior portion 32, the second interior portion 34, and the third interior portion 36 comprise a common cavity within the second adapter 18. In the illustrated and preferred embodiment, the first interior portion 32 is shown in the form of a rectangular (e.g., square) socket configured to receive a rectangular (e.g., square) drive member (e.g., rectangular drive member of a ratcheting socket wrench). In the illustrated and preferred embodiment, the first interior portion 32 includes a detent groove 38 configured to receive a ball detent 26. In the illustrated and preferred embodiment, the second interior portion 34 is shown in the form of an elongated circular passage connecting the first interior portion 32 to the third interior portion 36. In the illustrated and preferred embodiment, the second adapter 18 is configured such that the first drive end 22 of the first adapter 16 may pass freely through the first interior portion 32 and the second interior portion 34 to engage the third interior portion 36. In the illustrated and preferred embodiment, the third interior portion 36 is rectangular (e.g., square) and comprises a detent groove 38 configured to receive a ball detent 26. In the illustrated and preferred embodiment, the second drive end 30 is rectangular (e.g., square) and comprises a ball detent 26.

Figure 4A:
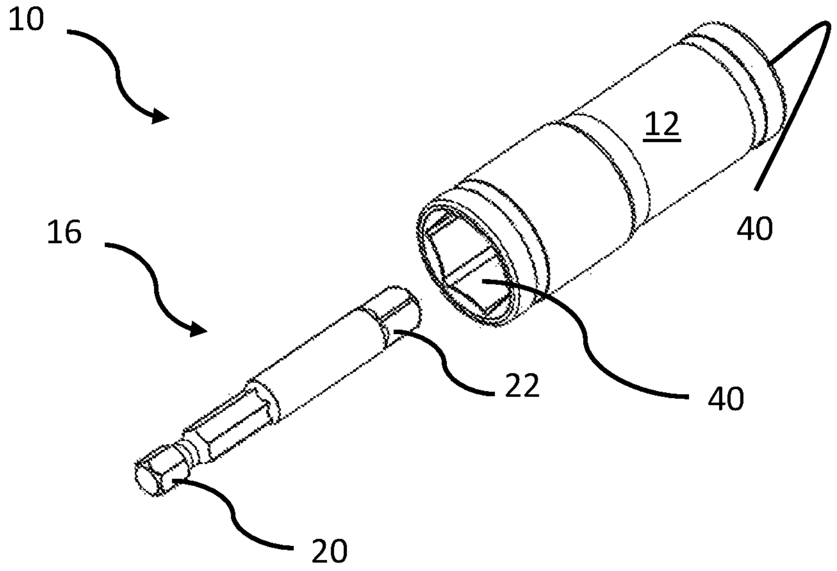
FIG. 4A is a disassembled perspective view from the front and side of the reversable flip socket set shown in FIG. 1 in a different configuration.
Figure 4B:
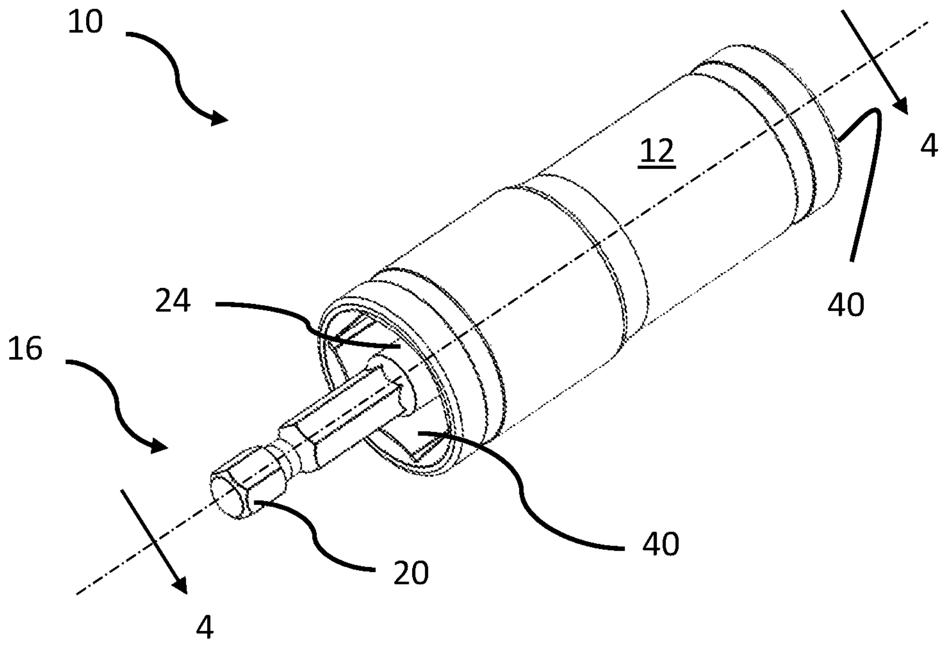
FIG. 4B is an assembled perspective view from the front and side of the reversable flip socket of FIG. 4A.
Figure 4C:
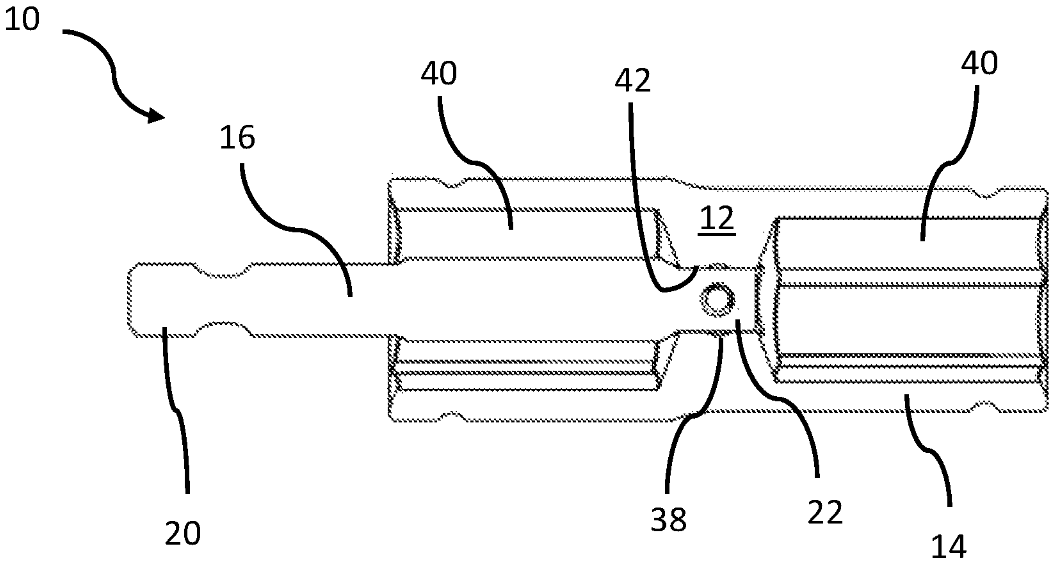
FIG. 4C is a section view taken along line 4-4 in FIG. 4B.

In the illustrated and preferred embodiment, as best shown in FIG. 4C, the reversable first socket 12 comprises a pair of opposed first socket ends 40 and a first engagement portion 42 therebetween. In the illustrated and preferred embodiment, the first socket ends 40 and the first engagement portion 42 form (e.g., comprise) a common cavity within the reversible first socket 12. In the illustrated and preferred embodiment, the first socket ends 40 are hexagonal sockets configured to engage bolts having hexagonal heads. In the illustrated and preferred embodiment, the first socket 12 is configured such that the first drive end 22 of the first adapter 16 may pass freely through the first socket ends 40 to engage the first engagement portion 42. In the illustrated and preferred embodiment, the first socket ends 40 are different sizes to allow the reversible first socket to engage bolts of two different head sizes. In the illustrated and preferred embodiment, the first engagement portion 42 is rectangular (e.g., square) and comprises a detent groove 38.

In the illustrated and preferred embodiment, as best shown in FIGS. 2B, 3A, 3B, 5C, and 5D, the reversable second socket 14 comprises a pair of opposed second socket ends 44 and a second engagement portion 46 therebetween. In the illustrated and preferred embodiment, the second socket ends 44 and the second engagement portion 46 form (e.g., comprise) a common cavity within the reversible second socket 14. In the illustrated and preferred embodiment, the second socket ends 44 are hexagonal sockets configured to engage bolts having hexagonal heads. In the illustrated and preferred embodiment, the second socket 14 is configured such that the second drive end 30 of the second adapter 18 may pass freely through the second socket ends 44 to engage the second engagement portion 46. In the illustrated and preferred embodiment, the second socket ends 44 are different sizes to allow the reversible second socket to engage bolts of two different head sizes. In the illustrated and preferred embodiment, the second socket ends 44 are different sizes than the first socket ends 40 of the first socket 12. In the illustrated and preferred embodiment, the second engagement portion 46 is rectangular (e.g., square) and comprises a detent groove 38. In the illustrated and preferred embodiment, the first engagement portion 42 of the reversable second socket 14 is larger (e.g., different) than the reversable first socket 12.

FIGS. 2A-3B show various views of one configuration (e.g., third configuration) of the preferred embodiment of the flip socket set 10. Cross-section views of this configuration are shown in FIGS. 2B-2D. In this configuration of the illustrated and preferred embodiment, the second drive end 30 of the second adapter 18 is engaged (e.g., drivingly engaged) to the second engagement portion 46 of the reversable second socket 14. When engaged with the reversable second socket 14 in the illustrated and preferred embodiment, the receiving end 28 of the reversable second socket 14 extends from the reversable second socket 14. In the illustrated and preferred embodiment, the ball detent 26 of second adapter 18 is configured to releasably engage the detent groove 38 of the reversable second socket 14 to releasably and drivingly engage the second adapter 18 to the second socket 14. In this configuration (e.g., third configuration) of the illustrated and preferred embodiment, the first drive end 22 of the first adapter 16 is engaged (e.g., drivingly engaged) with the third interior portion 36 of the second adapter 18, and the driven end 20 extends from the second adapter 18. In the illustrated and preferred embodiment, the ball detent 26 of first adapter 16 is configured to releasably engage the detent groove 38 of the second adapter 18 to releasably and drivingly engage the first adapter 16 to the second adapter 18. In this configuration of the illustrated and preferred embodiment, the first adapter 16 is drivingly engaged to the second adapter 18 which is drivingly engaged to the reversible second socket 14 such that, when the first adapter 16 is engaged with a driver (e.g., a torque driver, ratchet wrench, etc.) torque from the driver is transferred from the driven end 20 to the second adapter 18 and the reversible second socket 14.

FIGS. 4A-4C show various views of a different configuration of the preferred embodiment of the flip socket set 10. A cross-section view of this configuration (e.g., first configuration) is shown in FIG. 4C. In this configuration of the illustrated and preferred embodiment, the first drive end 22 of the first adapter 16 is engaged (e.g., drivingly engaged) to the first engagement portion 42 of the reversable first socket 12. When engaged with the reversable first socket 12, in the illustrated and preferred embodiment, the driven end 20 of the reversable first adapter 16 extends from the reversable first socket 12. In the illustrated and preferred embodiment, the ball detent 26 of first adapter 16 is configured to releasably engage the detent groove 38 of the reversable first socket 12 to releasably and drivingly engage the first adapter 16 to the first socket 12. In this configuration of the illustrated and preferred embodiment, the first adapter 16 is drivingly engaged to the reversible first socket 12 such that, when the first adapter 16 is engaged with a driver (e.g., a torque driver, ratchet wrench, etc.) torque from the driver is transferred from the driven end 20 to the reversible first socket 12.

FIGS. 5A-5D show various views of a different configuration of the preferred embodiment of the flip socket set 10. A cross-section view of this configuration is shown in FIG. 4C. In this configuration (e.g., second configuration) of the illustrated and preferred embodiment, the second drive end 30 of the second adapter 18 is engaged (e.g., drivingly engaged) to the second engagement portion 46 of the reversable second socket 14. When engaged with the reversable socket 14, in the illustrated and preferred embodiment, the receiving end 28 of the reversable second adapter 18 extends from the reversable second socket 14. In the illustrated and preferred embodiment, the ball detent 26 of second adapter 18 is configured to releasably engage the detent groove 38 of the reversable second socket 14 to releasably and drivingly engage the second adapter 18 to the reversible second socket 14. In this configuration of the illustrated and preferred embodiment, the second adapter 18 is drivingly engaged to the reversible second socket 14 such that, when the second adapter 18 is engaged with a driver (e.g., a torque driver, ratchet wrench, etc.), torque from the driver is transferred from the receiving end 28 to the reversible second socket 14.

Preferred embodiments of the inventive concepts are described herein, including the best mode known to the inventor(s) for carrying out the inventive concepts. Variations of those preferred embodiments will become apparent to those of ordinary skill in the art upon reading the foregoing description. The inventor(s) expect skilled artisans to employ such variations as appropriate, and the inventor(s) intend that the inventive concepts can be practiced otherwise than as specifically described herein. Accordingly, the inventive concepts disclosed herein include all modifications and equivalents of the subject matter recited in the claims appended hereto as permitted by applicable law. Moreover, any combination of the above-described elements and features in all possible variations thereof is encompassed by the inventive concepts unless otherwise indicated herein or otherwise clearly contradicted by context. Further in this regard, while highly preferred forms of the flip socket set 10 are shown in the figures, it should be understood that this disclosure anticipates variations in the specific details of each of the disclosed components and features of the material dispenser and that no limitation to a specific form, configuration, or detail is intended unless expressly and specifically recited in an appended claim.

For example, while the flip socket set 10 is discussed as being used with impact drivers and/or socket wrenches, any type of a drive member (e.g., drivers and wrenches may be used.

As another example, while the reversible first socket 12 and reversible second socket 14 are shown as having socket ends 40, 44 having different sizes, in some examples the socket ends 40, 44 may be the same size. In some examples, the flip socket set 10 may have multiple reversible first sockets 12, each reversible first socket 12 having first socket ends 40 of different sizes. In some examples, the flip socket set 10 may have multiple second sockets 14, each second socket 14 having second socket ends 44 of different sizes. In some examples, the first socket ends 40 are larger than the second socket ends 44. In some examples, the second socket ends 44 are larger than the first socket ends 42. While the first socket ends 42 and second socket ends 44 are shown in a hexagonal form configured to drive threaded fasteners having hexagonal heads, any shaped socket end may be used to drive threaded fasteners having other shapes. While the reversible first socket 12 and reversible second socket 14 are shown as reversible flip sockets having a pair of socket ends 40, 44, in some examples the first socket 12 and second socket 14 may not be reversible and may comprise a single socket end 40, 44 and an associated engagement portion 42, 46.

As a further example, while the driven end 20 is shown having a hexagonal shank, any shape or type of shank may be used. While the first drive end 22 and the second drive end 30 are shown in rectangular forms, any shape having 3 or more side may be used. While the extending length 24 is shown in a circular form, any shape may be used (e.g., square, hexagonal, etc.). While the first interior portion 32 is shown in a rectangular form to receive a rectangular drive member, any shape (e.g., triangular, hexagonal, etc.) may be used. While the second interior portion 34 is shown in the form of an elongated circular passage, any shaped passage may be used. While the third interior portion 36 is shown in a rectangular form, any shape may be used.

In a further example, while the first socket ends 40 and the first engagement portion 42 are shown to form a common cavity within the reversible first socket 12, in some examples each first socket end 40 may comprise a different cavity each with a different first engagement portion 42. While the second socket ends 44 and the second engagement portion 46 are shown to form a common cavity within the reversible second socket 14, in some examples each second socket end 44 may comprise a different cavity each with a different second engagement portion 46.

As another example, while the socket set 10 is shown using ball detents 26 and detent grooves 38, in some examples, the socket set 10 may not use ball detents 26 and detent grooves 38. Other forms of releasable engagement may be used, for example, friction fitting.

In another example, while the second adapter 18 is shown having a first interior portion 32, a third interior portion 36, and a second interior portion 34 therebetween, in some examples the second adapter 18 may no have the second interior portion 34 and the first interior portion 32 may be directly connected to the third interior portion 36.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. The use of any and all examples, or exemplary language (e.g., "such as") provided herein, is intended merely to better illuminate the inventive concepts disclosed herein and does not pose a limitation on the scope of any invention unless expressly claimed. No language in the specification should be construed as indicating any non-claimed element as essential to the practice of the inventive concepts disclosed herein.

What is claimed is:

1. A tool comprising:

a reversable first socket having a first socket end configured to engage a bolt having a first size, a second socket end configured to engage a bolt having a second size, and a first engagement portion therebetween;

a reversable second socket having a third socket end configured to engage a bolt having a third size, a fourth socket end configured to engage a bolt having a fourth size and a second engagement portion therebetween;

an elongated first adapter having a driven end, a first drive end opposite the driven end, and an extending length therebetween;

wherein the reversable first socket is configured to allow the first drive end to pass through the first socket end to engage the first engagement portion and to allow the first drive end to pass through the second socket end to engage the first engagement portion; and wherein the elongated first adapter has a maximum outer dimension sized to be received in the first socket end and the second socket end; and an elongated second adapter having a receiving end opposite a second drive end;

wherein the receiving end comprises:

- a first driven socket configured to receive a drive member;
- a second driven socket configured to receive the first drive end; and
- a passage extending from the first driven socket to the second driven socket; and wherein the reversable second socket is configured to allow the second drive end to pass through the third socket end to engage the second engagement portion and to allow the second drive end to pass through the fourth socket end to engage the second engagement portion.

2. The tool of claim 1, wherein the second drive end comprises a ball detent configured to engage a detent groove associated with the second engagement portion.

3. The tool of claim 1, wherein the first drive end of the elongated first adapter comprises a ball detent configured to engage a first detent groove associated with the second driven socket.

4. The tool of claim 1, wherein the first size and the second size are greater than the third size and the fourth size.

5. The tool of claim 1, wherein the first socket end, second socket end, third socket end, and fourth socket end are substantially hexagonal and are each configured to engage bolts having hexagonal heads of different sizes.

6. The tool of claim 1, wherein, when arranged in a first configuration where the driven end is received by an impact driver, the first drive end is received by the first engagement portion and torque applied from the impact driver to the driven end is transferred to the first socket end or the second socket end.

7. The tool of claim 6, wherein, when arranged in a second configuration where the driven end is received by an impact driver, the first drive end is received by the second driven socket, and the second drive end is received by the second engagement portion, torque applied from the impact driver to the driven end is transferred to the third socket end or the fourth socket end.

8. A tool comprising:

a first socket having a pair of opposed first socket ends and a first engagement portion therebetween;

a second socket having a pair of second opposed socket ends and a second engagement portion therebetween;

a first adapter having a driven end, a first drive end opposite the driven end, and an extending length therebetween;

wherein the reversable first socket is configured to allow the first adapter to pass through one of the first socket ends to engage the first engagement portion; and wherein the first adapter has a maximum outer dimension sized to be received in the first socket ends; and an elongated second adapter having a receiving end opposite a second drive end;

wherein the receiving end comprises:

a first interior portion configured to receive a drive shaft;

a second interior portion connected to the first interior portion and configured to allow the first drive end to pass therethrough; and a third interior portion connected to the second interior portion and configured to engage the first drive end; and wherein the reversable second socket is configured to allow the second drive end to pass through one of the second socket ends to engage the second engagement portion.

9. The tool of claim 8, wherein the second drive end of the second adapter comprises a ball detent configured to engage a detent groove associated with the second engagement portion.

10. The tool of claim 8, wherein the first drive end of the first adapter comprises a ball detent configured to engage a first detent groove associated with the third interior portion or a second detent groove associated with the first engagement portion of the reversable first socket.

11. The tool of claim 8, wherein the first socket ends and the second socket ends are substantially rectangular and configured to engage a bolt having a rectangular head.

12. The tool of claim 8, wherein, when arranged in a first configuration where the driven end is received by an impact driver and the first drive end is received by the first engagement portion, torque applied from the impact driver to the driven end is transferred to the pair of opposed first socket ends.

13. The tool of claim 12, wherein, when arranged in a second configuration where the driven end is received by an impact driver, the first drive end is received by the third interior portion, and the second drive end is received by the second engagement portion, torque applied from the impact driver to the driven end is transferred to the pair of opposed first socket ends.

14. A tool comprising:

a reversable first socket having a pair of opposed first socket ends and a first engagement portion therebetween;

a reversable second socket having a pair of second opposed socket ends and a second engagement portion therebetween;

an elongated first adapter having a driven end, a first drive end opposite the driven end, and an extending length therebetween, wherein the first adapter has a maximum outer dimension sized to be received in the first socket ends; and an elongated second adapter having a receiving end opposite a second drive end, wherein the receiving end comprises a first interior portion, a second interior portion connected to the first interior portion, and a third interior portion connected to the second interior portion;

wherein in a first configuration:

the first drive end is engaged to the first engagement portion with the driven end extending from the reversable first socket to transfer torque to the reversible first socket from a driver engaged with the driven end;

wherein in a second configuration:

the second drive end is engaged to the second engagement portion with the receiving end extending from the reversable second socket to transfer torque to the reversible second socket from a driver engaged with the first interior portion; and wherein in a third configuration:

the second drive end is engaged to the second engagement portion with the receiving end extending from the reversable second socket; and the first drive end is engaged with the third interior portion with the driven end extending from the elongated second adapter to transfer torque from a driver engaged with the driven end to the second adapter and the reversible second socket.

15. The tool of claim 14, wherein:

the first drive end comprises a first ball detent configured to engage a first detent groove associated with the third interior portion or a second detent groove associated with the first engagement portion; and the second drive end comprises a second ball detent configured to engage a third detent groove associated with the second engagement portion.

16. The tool of claim 14, wherein the first socket ends and the second socket ends are substantially hexagonal and configured to engage bolts having substantially hexagonal heads.

17. The tool of claim 14, wherein the first socket ends and the first engagement portion comprise a common cavity within the reversible first socket.

18. The tool of claim 14, wherein:

the first interior portion, the second interior portion, and the third interior portion comprise a common cavity within the elongated second adapter; and the extending length of the elongated first adapter and the second interior portion of the elongated second adapter are circular; and the second interior portion of the elongated second adapter is sized to receive the extending length of the elongated first adapter.

19. The tool of claim 14, wherein:

one of the pair of opposed first socket ends is configured to drivingly engage a threaded fastener having a first size and the other socket of the pair of opposed first socket ends is configured to drivingly engage a threaded fastener having a second size different from the first size.

20. The tool of claim 19, wherein:

one of the pair of opposed second socket ends is configured to drivingly engage a threaded fastener having a third size and the other socket of the pair of opposed second socket ends is configured to drivingly engage a threaded fastener having a fourth size different from the third size; and the third and fourth sizes are each different than the first and second sizes.

* * * * *